April 13, 1965   E. C. SIVERSON   3,177,904
CONVEYOR BELTING
Filed Dec. 14, 1962   2 Sheets-Sheet 1

INVENTOR.
EDMUND C. SIVERSON
BY
Bean, Brooks, Buckley + Bean
ATTORNEYS.

April 13, 1965
E. C. SIVERSON
3,177,904
CONVEYOR BELTING
Filed Dec. 14, 1962
2 Sheets-Sheet 2
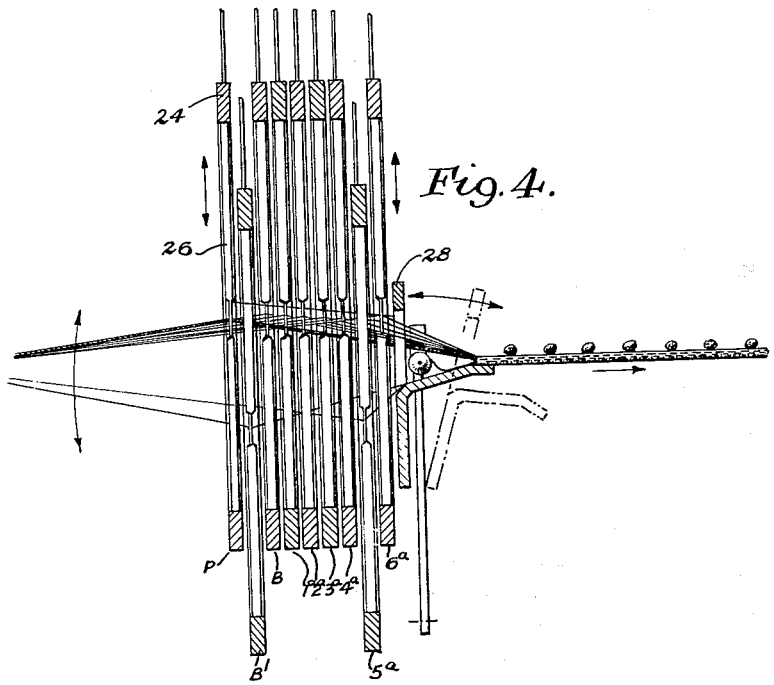
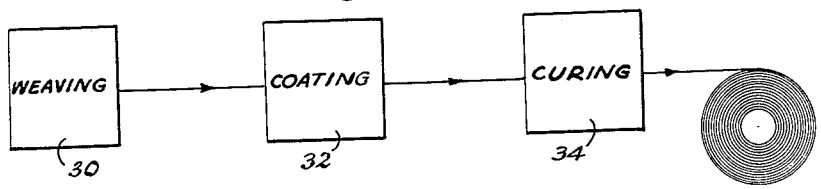
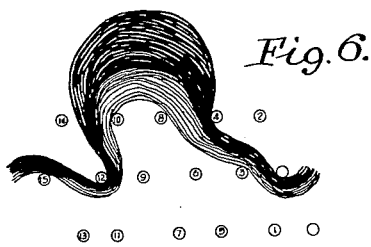
INVENTOR.
EDMUND C. SIVERSON
BY
Bean, Brooks, Buckley + Bean
ATTORNEYS

United States Patent Office 3,177,904
Patented Apr. 13, 1965

3,177,904
CONVEYOR BELTING
Edmund C. Siverson, Kenmore, N.Y., assignor to Buffalo Weaving and Belting Co., Buffalo, N.Y.
Filed Dec. 14, 1962, Ser. No. 244,819
4 Claims. (Cl. 139—409)

This invention relates to a woven member particularly adapted for use as a conveyor belt which may properly operate at substantial angles of inclination and to the method of making the same, the invention being more particularly adapted to such an article and method wherein at least one face of the belt is provided with upstanding projections thereon which otherwise form an integral part of the woven material.

In the art of conveyor belts, it is sometimes desirable to provide a belt having a superior gripping surface for use in conjunction with inclined conveyor mechanisms and various means may be provided for roughening or otherwise increasing the gripping action of a belt surface. However, such constructions are characterized by materially increasing the cost of the article of manufacture and it is, therefore, of primary concern in connection with the present invention to provide an arrangement for achieving an efficient construction particularly adapted for inclined conveyor belts wherein the cost of fabrication is not materially escalated. More particularly, this invention concerns a woven article of manufacture and method of producing the same wherein surface projections or roughened areas are provided during the weaving process so that no additional steps or operations are required subsequent to the manufacture of the basic component, as is characterized by prior art constructions.

A further object of this invention is to provide a novel woven body construction wherein loops are periodically formed in longitudinally spaced relationship in the body, which loops project outwardly from a face of the fabric and wherein the elements forming such loops are otherwise integrated in the construction of the woven body, requiring a minimum of alteration in the weaving process and, in general, contributing little to increase in manufacturing cost of the article.

A further object of this invention is to provide an improved method of weaving to form outstanding loops on a woven body wherein the elements forming the loops are normally integrated within a ply of the body which underlies a face ply thereof. Thus, in a three-ply woven construction, for example, the loom harness may be caused to periodically detain certain warp threads of the intermediate ply in elevated position while a plurality of filler picks are effected; the number of picks effected while such elevated relationship obtains being such that the elevated warp threads develop slack whereby when the so slackened warp threads are re-introduced into the woven construction of the body, loops are formed in outstanding relationship to the face ply of the fabric, as aforesaid.

Other objects and advantages of the invention will appear from the description hereinbelow and the accompanying drawing wherein:

FIG. 4 is a vertical section through a portion of a loom assembly illustrating a setup for achieving the configuration shown in FIG. 3 and showing the relative position of parts at the start of a "pebble" forming operation;

FIG. 5 is a block diagram illustrating the complete process of making a conveyor belt in accordance with the present invention; and FIG. 6 is an enlarged longitudinal section taken in the region of one of the "pebbles," the binder yarns being omitted for clarity of detail.

Figure 1:
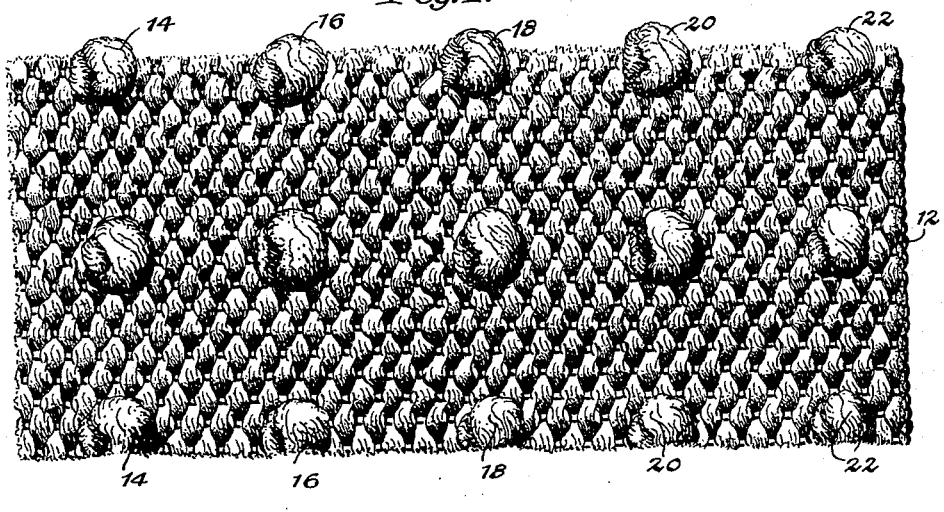
FIG. 1 is a plan view of a portion of a woven body constructed in accordance with the present invention.

Referring at this time more particularly to FIG. 1, the invention as shown therein will be seen to consist of a woven body indicated generally by the reference character 10 in which the longitudinal direction thereof is vertically oriented in this figure, reference character 12 indicating one side edge of the body. The body 10 consists of a multi-ply woven construction in which there are laterally spaced, longitudinally extending rows of loops or projections as indicated by reference characters 14, 16, 18, 20 and 22. It will be seen from FIGS. 1 and 2 that the various loops or projections form balls or pebbles of yarn lying upon the face of the fabric and which are parts of yarn otherwise integrally interwoven with the fabric. Each longitudinally extending series of pebbles is formed by the same warp yarn within the body of the fabric 10 and the yarns that are utilized to produce these pebbles are accordingly laterally spaced in the loom assembly in accord with the lateral spacing desired between adjacent pebbles.

Figure 2:
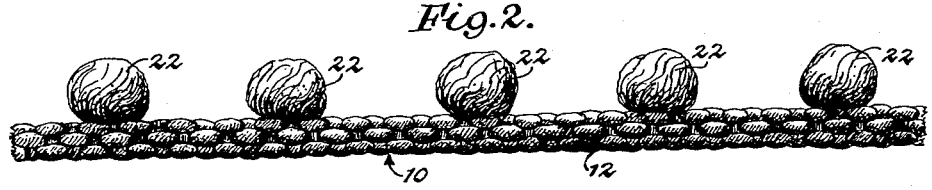
FIG. 2 is a side elevational view of the body as shown in FIG. 1.
Figure 3:
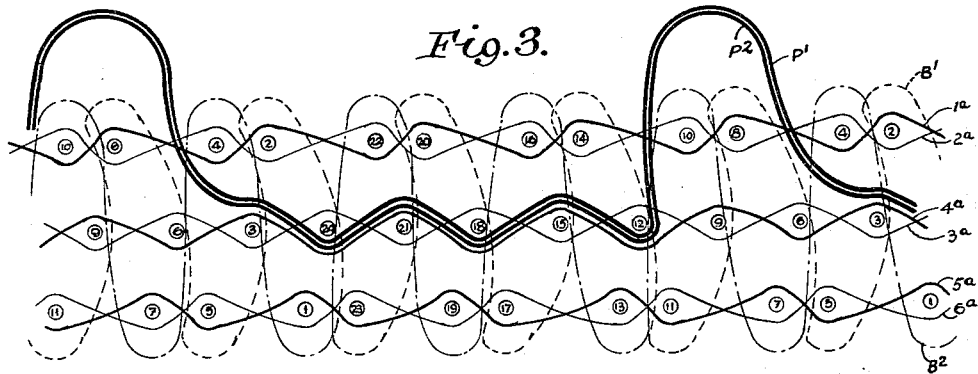
FIG. 3 is a schematic view illustrating a specific embodiment of the present invention and showing the relationship of various threads and yarns in the woven construction.

The manner in which this is accomplished can be best understood from a study of FIG. 3, in which embodiment the fabric will be seen to consist of a three-ply construction having a face ply provided by a plurality of face warp yarns such as those indicated by reference characters 1A and 2A, an intermediate ply provided by a plurality of intermediate ply warp yarns 3A and 4A and a back ply provided by a plurality of back ply warp yarns 5A and 6A. For the purpose of binding the several plies together, binder yarns B1 and B2 are provided as shown. In addition to the above, the construction according to FIG. 3 utilizes a pair of additional warp yarns indicated by reference characters P1 and P2 and it is these yarns interwoven in the manner shown specifically in FIG. 3 which provide the pebbles illustrated in the embodiment shown in FIGS. 1 and 2.

It will be appreciated that the circles having numbers therein in FIG. 3 designate numerically successive picks of the filler yarn and with the arrangement as is shown, it will be appreciated that the two extra warp yarns P1 and P2 are caused to follow the intermediate ply warp yarn 4A except in those portions wherein the pebbles are formed. Thus, as will be seen, the two warp yarns P1 and P2 are characterized by having spaced lengths thereof participating in the weave of the second ply, which lengths are joined by intermediate portions which do not participate in the weave but are, instead, looped upwardly out of the face ply periodically and in longitudinally spaced relationship, the two yarns P1 and P2 being held in elevated position within the shed for a period of time sufficient to permit the picks 5–11 inclusive to be made and then these two warp yarns P1 and P2 are brought down by the hardness to recommence their association with the warp thread 4A, substantially as is shown. During the time that the picks 5–11 are being made, the warp threads P1 and P2, as is seen in FIG. 4, are maintained elevated by the appropriate heddles 26 of the associated harness frame 24 through the action of the head motion, as will be understood by those skilled in the art. It will also be understood that each step of holding the warp yarns P1 and P2 in elevated position while an underlying portion of the fabric or material is woven will create an amount of slack in these warp yarns which is proportional to the number of picks involved in the underlying weave. Thus, the sizes of the pebbles 22 may be controlled by the number of picks made while the yarns P1 and P2, or their equivalent, are held or detained as aforesaid whereby they do not participate in the normal weaving operation. In the specific example shown in FIG. 3, seven picks are made during the time the yarns P1 and P2 do not participate in the weaves, such picks being those indicated by numerals 5–11. Consequently, when the yarns P1 and P2 are reintroduced into the normal weave, and the twelfth and successive picks are made, the beating action of the reed 28 during the first few next picks will tend to remove the aforesaid slack and thereby relax and "fluff" the loop formed by the pebble yarns P1 and P2 to produce the pebbles as shown in FIGS. 1 and 2. Moreover, as can be seen best in FIG. 6, it may be preferred that the pebble yarns P1 and P2 be substantially bulky so that the relaxation of the yarn in the lengths thereof which form the pebbles or loops will permit the pebbles to fluff substantially to project beyond the face of the fabric. Additionally, it will be seen that the precise manner illustrated in FIGS. 3 and 6 of bringing back the pebble yarns with the ordinary warp yarn 4A is such as to impart a natural inclination of the pebbles substantially as is shown. This tendency enhances the gripping action achieved by the conveyor belt as the same is utilized at substantial inclinations.

FIG. 5 illustrates the manner in which the entire process is effected. As shown therein, the weaving operation is first performed as indicated by reference character 30 and then the fabric is subjected to a coating or bath, as may be desired, in which the same is either coated or impregnated with a suitable and desired type of material (such as latex, for example) whereafter the coating may be cured as indicated by reference character 34.

From the above, it will be manifest that the pebble construction is easily and economically integrated into the weave of the belting material, obviating any additional, time consuming steps subsequent to the manufacture of the belting for reflecting the requisite loops projecting therefrom.

It is to be understood that certain changes and modifications as illustrated and described may be made without departing from the spirit of the invention or the scope of the following claims.

I claim:

1. In an article of manufacture adapted for use as a conveyor belt and the like,
    a woven body having a face ply and a second ply adjacent said face ply and binder yarns joining said plies, each ply including a plurality of longitudinally extending warp threads and a plurality of picks interwoven therewith,
    said second ply also including an additional warp thread, said additional warp thread having spaced lengths thereof woven into said second ply for a predetermined number of picks of such second ply with adjacent ends of said lengths being separated by a plurality of picks of said second ply less than said predetermined number of picks, said additional warp thread being continuous to provide intermediate portions thereof joining said spaced lengths, each of which intermediate portions projects from said second ply through said face ply between a pair of adjacent picks thereof and projects back through said face ply between another pair of adjacent picks thereof to straddle at least a pair of picks of said face ply and form a single outstanding loop.

2. In an article of manufacture adapted for use as a conveyor belt and the like,
    a woven body having a face ply and a second ply adjacent said face ply and binder yarns joining said plies, each ply including a plurality of longitudinally extending warp threads and a plurality of picks interwoven therewith,
    said second ply also including an additional warp thread, said additional warp thread having spaced lengths thereof woven into said second ply for a predetermined number of picks of such second ply with adjacent ends of said lengths being separated by a plurality of picks of said second ply less than said predetermined number of picks, said additional warp thread being continuous to provide intermediate portions thereof joining said spaced lengths, each of which intermediate portions projects first from said second ply through said face ply and then back through said face ply back to said second ply, said additional warp thread being substantially bulky so that said intermediate portions of the additional warp thread fluff substantially to project beyond the face of said face ply.

3. The article as defined in claim 1 wherein said additional warp thread is substantially bulky so that said intermediate portions thereof fluff substantially to project beyond the face of said face ply.

4. In an article of manufacture adapted for use as a conveyor belt and the like,
    a woven body having a face ply and a second ply adjacent said face ply and binder yarns joining said plies, each ply including a plurality of longitudinally extending warp threads and a plurality of picks interwoven therewith,
    said second ply also including an additional warp thread, said additional warp thread having spaced apart lengths interwoven for a predetermined number of picks in said second ply along with one of the warp threads thereof, and having intermediate portions joining such lengths which do not participate in the weave of said second ply so that said lengths are spaced apart by a number of picks less than said predetermined number of picks, each intermediate portion being passed first out and then back through said face ply to straddle a pair of picks of said face ply and form a single loop on the face of the article, and said additional warp yarn being substantially bulky to permit said loop to fluff and form an outstanding pebble on the face of the article.

References Cited by the Examiner

UNITED STATES PATENTS

| 823,892 | 6/06 | Parkes | 74—232 |
|---|---|---|---|
| 1,569,579 | 1/26 | Russell | 139—409 |
| 1,571,085 | 1/26 | Brahs | 139—408 |
| 1,941,912 | 1/34 | Repony. | |
| 2,242,128 | 5/41 | Hornsby | 154—52.1 |
| 2,794,450 | 6/57 | Gatzke | 139—411 |
| 2,864,409 | 12/58 | Richter | 139—408 |
| 2,941,410 | 6/60 | Ota | 198—193 |

FOREIGN PATENTS

| 262,214 | 12/26 | Great Britain. |
|---|---|---|
| 894,141 | 4/62 | Great Britain. |
| 907,009 | 9/62 | Great Britain. |

DONALD W. PARKER, *Primary Examiner.*

RUSSELL C. MADER, *Examiner.*